Oct. 9, 1928.
C. BRCECINSKI
1,686,793
ART OF ELEVATING GRAIN
Filed Nov. 13, 1924    2 Sheets-Sheet 1
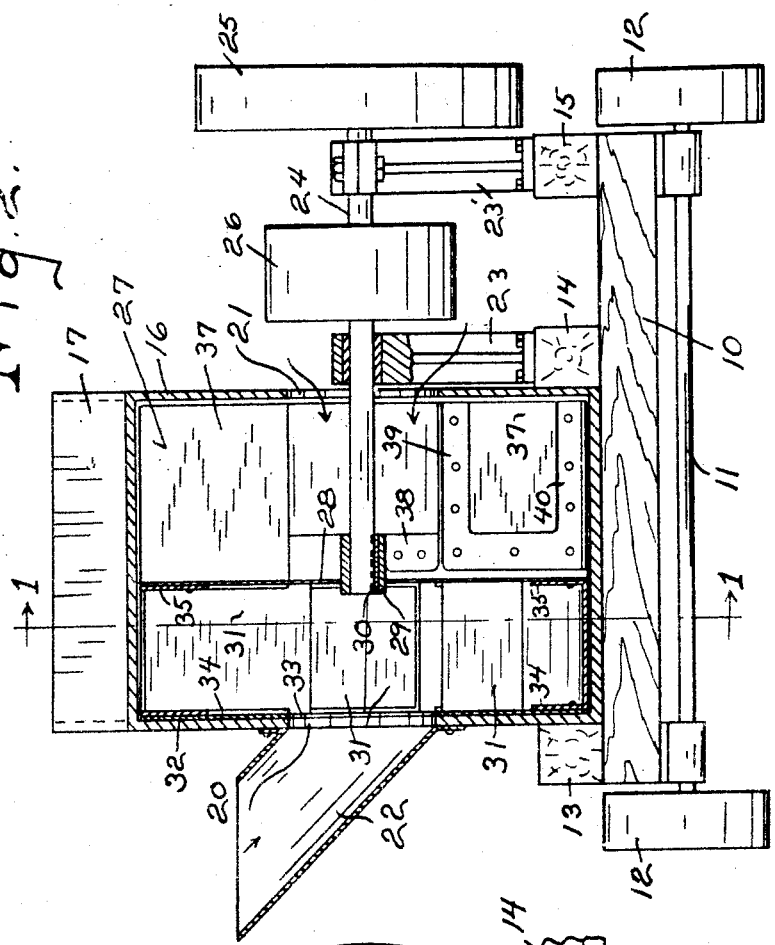
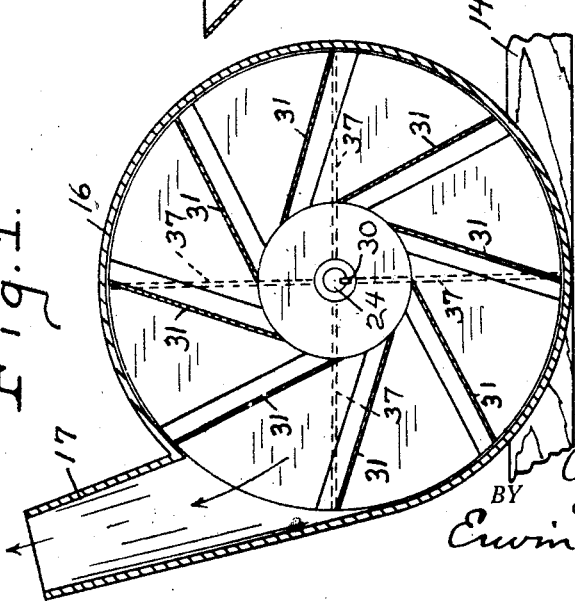
INVENTOR.
Carl Brcecinski
BY
Erwin, Wheeler & Woolard
ATTORNEYS.

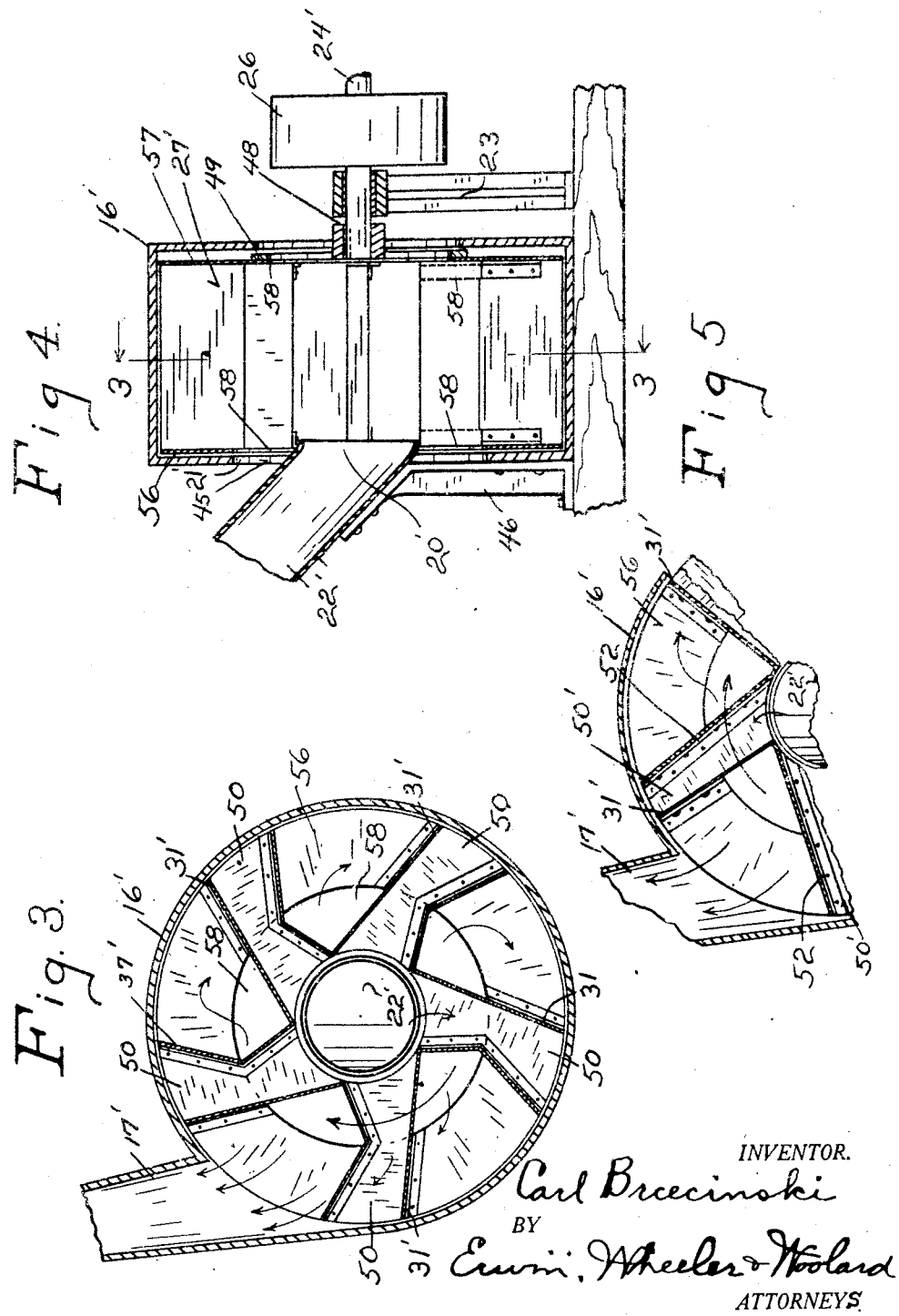

Patented Oct. 9, 1928.

1,686,793

UNITED STATES PATENT OFFICE.

CARL BRCECINSKI, OF MAUSTON, WISCONSIN.

ART OF ELEVATING GRAIN.

Application filed November 13, 1924. Serial No. 749,777.

This invention relates to improvements in the art of elevating grain, and more particularly to small grain elevators of the blower type. The device hereinafter disclosed may also be used as a silo filler or for any other similar purpose, but it is of particular advantage to use the device in connection with the handling of grain.

Existing devices for elevating grains with which I am familiar are so designed as to hurl the grain centrifugally through the delivery pipe, thereby causing great damage to the grain. A large proportion of the individual kernels of grain handled by the usual type of grain elevator will be bruised or broken, or will have their exterior protective husk damaged or wholly removed. I have found that the injury is caused in large part by the contact of the individual kernels of grain with the sides of the delivery pipe.

It is the object of the present invention to design a machine of the blower type which will act upon grain to elevate it more efficiently than any machine with which I am familiar and at the same time without injury to the grain. I have found that the machine hereinafter disclosed is capable of elevating grain without injury thereto and with higher efficiency than any other machine with which I am familiar. More specifically stated, it is the object of this invention to ensure the provision of a cushioning body of air which will accompany the grain and float it or carry it during its upward movement, at the same time protecting the grain from contact with the walls of the conduit through which it is elevated. I have found that a machine of the type herein disclosed operates almost silently, being free of the rumbling sound which is characteristic of other machines for the purpose, and which is caused by grain striking the sides of the conduit through which it passes.

It is a further object of this invention to avoid the possibility of clogging or overloading a machine of this character by providing separate blades or blade portions for discharging grain and air. In this manner I avoid the delivery of grain only and ensure that at all times there will be an adequate supply of air delivered from the machine for the purposes aforesaid.

In the drawings:

Figure 1 is a section taken on line 1—1 of Figure 2, transversely of the axis of rotation of a device embodying this invention.

Figure 2 is a longitudinal section through the device shown in Figure 1.

Figure 3 is a section similar to Figure 1, showing a modified device.

Figure 4 is a longitudinal section through the device shown in Figure 3.

Figure 5 is a fragmentary view similar to Figure 3 and showing a further modification.

Like parts are identified by the same reference characters throughout the several views.

The particular machine herein disclosed is illustrated as mounted on the bed or platform 10 which, for portability, is provided with an axle 11 and wheels 12. The bed plates 13, 14, and 15 provide means for mounting the blower device on platform 10.

Between bed plates 13 and 14 is mounted a casing 16 which may be constructed in the usual manner to provide a substantially tangential outlet or delivery pipe 17 which, by the addition of the usual sections, may be extended to any desired length.

The casing is provided with two axial inlets 20 and 21, respectively, the former being provided with a hopper 22 whereby grain may be introduced conveniently therethrough. Inlet 21 is adapted for the admission of air only, in accordance with the principle above expressed.

Bearing brackets 23 and 23', mounted respectively upon bed plates 14 and 15, provide suitable journals in which shaft 24 is rotatable. The shaft carries a fly wheel 25, a driving pulley 26, and, within casing 16, a duplex fan designated in its entirety by reference character 27.

The fan may conveniently be assembled upon a central disk 28 having a hub portion 29 keyed at 30 to shaft 24. Projecting axially from the face of disk 28 are the blades 31 which are preferably not radial, but are inclined toward their delivery portions reversely with respect to the direction of rotation of the device. I have found that a reverse inclination of the blades from the radial tends to retard the flow of grain in a manner to render such flow more uniform than is the case where radial blades are employed. The blades tend to carry the grain with them for a short space of time instead of immediately discharging the grain from their ends. Thus, the grain is not batted or hurled by the blades but is delivered at a comparatively slow rate thereacross. The outer sides of the blades may conveniently be supported by the annular plate 32 which has a central opening 33 registering with the opening 20 of the casing. Each blade may conveniently be flanged at 34 and 35 for convenient connection with the plate 32 and disk 28, respectively.

The blades 37 project axially from disk 28 upon the opposite side thereof from blades 31. Blades 37 may be radial and may be fewer in number than blades 31. It is suitable to provide only four blades 37 equally spaced, as indicated in dotted lines in Figure 1.

By way of illustrating a further manner in which the blades may be supported I have shown disk 28 provided with radial angle iron members 38 attached to the face of the disk and carrying the axially projecting arms 39 and 40 which may likewise comprise angle irons and which serve to brace and support the rear sides of the blades 37.

In operation, it will be obvious that the duplex fan 27 will deliver a stream of air through the outlet pipe 17 which will pass therethrough simultaneously with such grain as is delivered through hopper 22. It will, furthermore, be obvious that even though hopper 22 is filled with grain so as completely to stop inlet port 20 against the passage of air, there will nevertheless be an adequate supply of air admitted through the separate port 21, which port, and blades 37, are designed to handle a quantity of air adequate for the pneumatic transportation of all grain which the machine will take through port 20. The retrogressvie inclination of blades 31 tends to make such blades hold the grain as aforesaid and controls the rate of discharge of the grain in such a manner that the discharge may be approximately uniform if grain is constantly supplied to the hopper. At the same time a uniform quantity of air will be supplied through port 21 and will be delivered by blades 37 to discharge pipe 17. The result will be that the grain will be floated upwardly through the discharge pipe without any material contact with the sides of the pipe. I have found that there is very little noise in the use of a machine of this character even though the pipe is curved. The air current acts in such a manner as actually to carry the grain around curves in the pipe while minimizing contact of the grain with the pipe.

The devices shown in Figures 3 to 5, inclusive, are similar in principle to that above discussed but are so designed as to effect an economy in space.

It will be obvious that as a blower fan is revolved in operation only the leading surfaces of the blades will be operative to transmit a substance acted upon by the fan. The inertia of the air or grain acted on by the fan tends to hold it to the leading surface of each successive blade, the remainder of the space between blades being substantially unused.

Taking advantage of the above fact, I have so designed the fan shown in Figure 3 that I am able to mount the fan in a casing 16′ which is of ordinary width instead of being of double width, as shown in Figure 2. Casing 16′ has a large inlet port 45 which is divided into two concentric ports 20′ and 21′, respectively, by the hopper 22′, the latter being supported on a suitable standard 46.

The shaft 24′ being suitably journaled in bearing bracket 23 carries a fan 27′ by means of a special hub 48 having an annular flange 49. The wheel or fan 27′ comprises in reality a group of chutes 50, each of which includes two blades connected by two sides to comprise a closed conduit. The several chutes are interconnected at their inner ends, as shown in Figure 3, and are carried by the flange 49 of hub 48. Their general direction is radial, but the blades 31′ are inclined reversely with respect to the direction of rotation of the device as are the blades 31 in the embodiment previously described. Blades 37′ in Figures 3 and 4 are not straight, but are angularly bent, the two portions thereof having opposite inclinations with respect to a radius of the fan. The Figure 5 construction differs from that shown in Figures 3 and 4 principally in the fact that the chutes 50′, shown in Figure 5, are so constructed that the blade 52 which corresponds to blade 37′ of Figures 3 and 4 is straight instead of being angularly bent. Either construction will successfully carry out the principles involved in the present invention.

The several chutes may conveniently be braced from each other by extending in the form of annular webs 56 and 57, the side walls common to all of the chutes 50. Sector-shaped openings 58 in the annular webs 56 and 57 between chutes 50 are adapted to permit the entrance of air into the space between the chutes, whereby such air will be acted upon by blades 37′ in the case of the Figure 3 and Figure 4 embodiment, and by blades 52 in the case of the Figure 5 embodiment.

In reality the devices shown in Figures 3 to 5, inclusive, each provide two fans in the space which would ordinarily be required for one, and the arrangement is such that the one fan is reserved exclusively for air and the other fan operates upon the grain, and such air as is admitted with the grain, as is also the case in the device shown in Figures 1 and 2. The grain is delivered by hopper 22' in the last described constructions to the central space which is common to all of the several chutes 50. Thereby the grain is delivered to blades 31' of the several chutes 50 and is discharged from said blades through the discharge pipe 17'. At the same time air will be admitted through the port 21', which is defined by the casing on one hand and by the hopper 22' on the other, and such air is acted upon by blades 37' in the Figure 3 and 4 construction, and by blades 52 in the Figure 5 construction. In this way the duplex fan will deliver alternately from its several blades charges of air and charges of grain. It differs in this respect from the type of duplex fan shown in Figure 2 in that the Figure 2 device may be constructed to deliver air and grain simultaneously from the separate blades which handle these substances. In both devices, however, the delivery to the discharge pipe of an adequate quantity of air to handle the maximum amount of grain which can be elevated is assured at all times.

I claim:

1. In a device of the character described, the combination with a rotor comprising a set of chutes supported for rotation about a common axis and interconnected at their respective ends adjacent said axis, said chutes extending inwardly of the periphery of the rotor and being inclined rearwardly of the direction of rotation thereof, of a casing providing an outlet, and inlet areas leading respectively to the space between the ends of said chutes and to the spaces between said chutes outwardly of their interconnection, and a hopper arranged to deliver material into one of said inlet areas.

2. In a device of the character described, the combination with a hopper, of a rotor having an open center and including separate chutes extending symmetrically outwardly from said center and interconnected for unitary rotation, said chutes extending inwardly of the periphery of the rotor and being inclined rearwardly of the direction of rotation thereof, said hopper being arranged to deliver material in the open center of said rotor for discharge through said chutes, together with a casing having an outlet port, and an inlet port adapted to admit material to the several spaces between said chutes exteriorly of their interconnection.

3. In a device of the character described, the combination with a hopper, of a rotor provided with a set of chutes extending symmetrically outwardly from the axis of said rotor and interconnected for unitary rotation; said chutes each including a rear blade inclined inwardly of the rotor and rearwardly of the direction of the rotation thereof, a front blade spaced from the rear blade and having an outer portion inclined inwardly of the rotor and rearwardly of the direction of rotation of the rotor and an inner portion inclined forwardly of the direction of the rotor and away from the rear blade; and a casing enclosing said rotor and provided with a pair of inlet ports, one of which leads to the forward face of the rear blade and the other of which leads to the forward face of the front blade, said casing having an outlet port.

4. In a device of the character described, the combination with a hopper, of a rotor provided with a set of blades extending inwardly of the periphery of the rotor and rearwardly of the direction of rotation thereof and a casing enclosing said rotor and provided with an outlet and a pair of inlets, one of which cooperates with a portion of said blades and the other of which cooperates with the remainder of said blades.

CARL BRCECINSKI.